April 27, 1943.    W. J. SCHEIBER    2,317,811
COATED METAL WIRE
Filed May 2, 1940
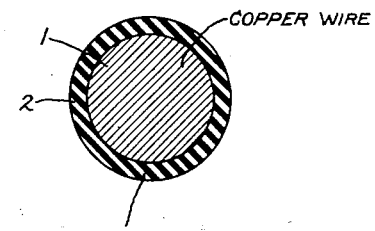
COPPER WIRE
ENAMEL COATING COMPRISING
A SUPERPOLYAMIDE AND AN
ALKYD RESIN HAVING AN ACID
NUMBER ABOVE 50, THE ENAMEL
BEING BAKED TO A BLACKENED,
PARTIALLY OXIDIZED STATE
Inventor:
William J. Scheiber,
by Harry E. Dunham
His Attorney.

Patented Apr. 27, 1943

2,317,811

UNITED STATES PATENT OFFICE 2,317,811

COATED METAL WIRE

William J. Scheiber, Schenectady, N. Y., assignor to General Electric Company, a corporation of New York Application May 2, 1940, Serial No. 332,976

5 Claims. (Cl. 174—125)

This invention relates to coated metal wire and is concerned particularly with coatings comprising heat treated mixtures of superpolyamides and certain alkyd resins.

The superpolyamides used in carrying out this invention are described in United States Patent 2,130,523 to W. H. Carothers and are derived from the reaction of diamines of the formula $NH_2CH_2RCH_2NH_2$ and dicarboxylic acids (and their amide-forming derivatives) of the formula $HOOCCH_2R'CH_2COOH$ in which R and R' are divalent hydrocarbon radicals and in which R has a chain length of at least two carbon atoms. Within this class, the most desirable superpolyamides in carrying the present invention into effect are prepared from diamines of the formula $NH_2(CH_2)_xNH_2$ and dicarboxylic acids of the formula $HOOC(CH_2)_yCOOH$ in which $x$ is at least 4 and $y$ at least 3. A preferred superpolyamide is a reaction product of hexamethylene diamine and adipic acid.

A process of coating metal surfaces, such as copper wires, with superpolyamide compositions and products resulting therefrom are more fully described in my copending application Serial No. 332,978, filed concurrently herewith and assigned to the same assignee as the present invention. In accordance with the teachings of that application, coated wires having more flexible and more closely adhering coatings are obtained by coating a wire with a solution of superpolyamide and thereafter baking the coated wire to such an extent that a substantial blackening or partial oxidation of the coating results. Insulated magnet wires of this type are particularly adapted for use in electrical apparatus such as motors, magnets, electric coils and the like.

The present invention relates to wires, specifically copper wires, coated with mixtures of superpolyamides and acidic alkyd resins in which the alkyd resin is present in substantial amounts not substantially exceeding 40 per cent by weight based on the superpolyamide. One embodiment of my invention is illustrated in the accompanying drawing wherein is shown a copper wire 1 provided with an enamel coating comprising a superpolyamide and an acidic alkyd resin baked to a blackened, partially oxidized state. Such compositions offer certain advantages as wire coatings including a substantial decrease in the cost of the coating compositions over straight superpolyamide compositions and a material increase in the rate of production of the finished wire. Preferably, the alkyd resins employed have an acid number of 50 or more. Marked advantages are derived from the use of alkyd resins having acid numbers exceeding 100.

A suitable enamel may be made from the following formulation:

| | Parts by weight |
|---|---|
| Superpolyamide | 15 |
| Diethyleneglycol maleate resin | 5 |
| Cresol | 64 |
| Coal tar naphtha | 16 |

The above ingredients are heated to 180° C. and stirred until the superpolyamide and resin are dissolved. After cooling to room temperature, the resulting enamel is applied to wire by suitable methods and the coated wire is thereafter baked. The diethyleneglycol maleate resin used in this formation has an acid number of about 50.

Another suitable composition containing a glyceryl phthalate resin having an acid number of 168 may be prepared from the following ingredients:

| | Parts by weight |
|---|---|
| Superpolyamide | 15 |
| Glyceryl phthalate resin | 5 |
| Cresol | 64 |
| Coal tar naphtha | 16 |

The method of compounding this enamel is the same as that used in the preparation of the diethyleneglycol maleate composition. The enamel composition is applied to copper wire or the like by the usual enameling process wherein the wire is passed continuously through a solution of the coating material and thereafter through an oven wherein the coating is baked to the desired extent. The desired bake may be obtained either by regulating the temperature of the oven, which ordinarily is in the neighborhood of 300° C. or above, by regulating the speed of the wire passing through the oven, or by both such means. This coating process is repeated until the preferred insulation thickness or build is obtained, each application of coating material being baked before the next layer is applied. As is more fully described in my abovementioned copending application, wire enamels comprising superpolyamide compositions have been found to pass the knot and quick stretch tests, indicating that the film has sufficient flexibility and closely adheres to the wire, only when the enamel coating has been baked to a substantially blackened, and probably partially oxidized, state. If the temperature of the oven and speed of the wire through the oven are such that this condition is not obtained, optimum flexibility and adherence to the wire do not result. On the other hand, excessive baking produces a brittle film on the wire which results in a cracking of the enamel whenever the wire is bent.

The properly baked enamels of my invention, besides having good flexibility and good adhesion to the underlying metallic surface, are also abrasion resistant, solvent resistant and exhibit high dielectric strengths both before and after soaking in water. For example, the dielectric strength of the baked glyceryl phthalate modified superpolyamide enamel described above was 2560 volts per mil before soaking in water and 1260 volts per mil after 16 hours' immersion in water. The appearance of the wire may be described as semi-glossy and black. Wires coated with unmodified superpolyamide compositions ordinarily do not have a glossy or even a semi-glossy appearance.

As previously stated, for any given oven temperature there is a critical speed for the wire at which speed the desired flexible, adhesive, blackened coating is obtained. I have discovered that this critical speed increases as the acid value of the modifying alkyd resin increases so that by modifying an ordinary superpolyamide composition with a sufficient amount of an alkyd resin having a reasonably high acid value, it is possible to increase the rate of production of enameled wire materially without sacrificing any of the desirable mechanical or electrical properties ordinarily possessed by the blackened unmodified superpolyamide coatings. The effect of the acid number of the alkyd resin on the finished wire and particularly on the critical speed or rate of baking will become more apparent from a comparison of the critical baking rates of various superpolyamide coatings. In the following table are given the critical baking speeds of wires coated with unmodified superpolyamide and with enamels modified with alkyd resins of varying acid numbers:

| Composition | Acid No. on alkyd resin | Critical speeds | |
|---|---|---|---|
| | | Minimum | Maximum |
| | | Ft./min. | Ft./min. |
| Unmodified superpolyamide: | | (¹) | (¹) |
| A | 12 | 20 | 23 |
| B | 38 | 20 | 22 |
| C | 54 | 22 | 25 |
| D | 85 | 22 | 25 |
| E | 110 | 22 | 25 |
| F | 146 | 22 | 25 |
| G | 204 | 25 | 28 |
| H | 243 | 25 | 28 |
| I | 258 | 28 | 31 |
| J | 328 | 28 | 31 |

¹ 20 or less (resins not compatible).

In preparing the above series, approximately 33 per cent by weight of glyceryl phthalate resin based on the superpolyamide was used as the modifying ingredient. The various compositions were applied to the wire using the same enameling equipment which in each instance was adjusted to the critical speed required for baking each of the enamels to the desired blackened state. It will be noted that ordinarily there is a range of wire speeds within which a satisfactory bake is obtained. Commenting further on the above series, it is of interest to note that the 28 foot per minute sample H was darker in color than the 25 foot per minute sample G. This is another example of the effect of highly acidic alkyd resins. In other words, superpolyamide compositions modified with the alkyd resins of higher acidity bake faster, as indicated by the blacker condition, than those modified with the less acidic alkyd resins. It will also be noted that all of the compatible alkyd resin-modified composition resins bake to a blackened, flexible, tightly-adhering state at a baking speed substantially in excess of the speed permissible in baking the unmodified superpolyamid under similar conditions to the equivalent state. In sample A, the low acid number alkyd resin was not compatible with the superpolyamide and gave a baked film which whitened (cracked) on stretching the wire.

It will thus be seen that there is a decided advantage from the production viewpoint in the addition of acidic alkyd resins to the superpolyamide compositions. In fact, by the use of an alkyd resin having an acid number of 200 or above, the rate of production of enamel wire may be increased approximately 50 per cent without materially detracting from the mechanical and electrical properties of the finished wire. Not only is it possible to operate at higher wire speeds during coating but, further, a substantial reduction in cost is obtained by the substitution of an acidic alkyd resin for part of the superpolyamide.

Wires coated in accordance with this invention are particularly useful in the fabrication of electric coils, dynamo-electric machines and the like. The resistance of the coating to attack by certain refrigerants, such as dichlorotetrafluoroethane, permits the use of the coated wires in the manufacture of certain types of refrigerator motors.

What I claim as new and desire to secure by Letters Patent of the United States is:

1. Copper wire having a semi-glossy, black, continuous, flexible coating tightly adhering thereto, said coating comprising a superpolyamide modified with a substantial amount but not exceeding 40% by weight thereof of an alkyd resin having an acid number above 50 and being baked on the wire to a partially oxidized and blackened state at a baking speed substantially in excess of the baking speed permissible in baking a wire coating composed entirely of the corresponding superpolyamide under similar conditions to a substantially blackened, and equivalent flexible, tightly adhering state.

2. Copper wire having a semi-glossy, black, continuous, flexible coating tightly adhering thereto, said coating comprising a superpolyamide modified with a substantial amount but not exceeding 40% by weight thereof of an alkyd resin having an acid number above 100 and being baked on the wire to a partially oxidized and blackened state at a baking speed substantially in excess of the baking speed permissible in baking a wire coating composed entirely of the corresponding superpolyamide under similar conditions to a substantially blackened, and equivalent flexible, tightly adhering state.

3. Copper wire having a semi-glossy, black, continuous, flexible coating tightly adhering thereto, said coating comprising a superpolyamide modified with a substantial amount but not exceeding 40% by weight thereof of a glyceryl phthalate resin having an acid number above 100 and being baked on the wire to a partially oxidized and blackened state at a baking speed substantially in excess of the baking speed permissible in baking a wire coating composed entirely of the corresponding superpolyamide under similar conditions to a substantially blackened, and equivalent flexible, tightly adhering state.

4. Copper wire having a semi-glossy, black, continuous, flexible coating tightly adhering thereto, said coating comprising a superpolyamide modified with approximately 33 per cent by weight thereof of a glyceryl phthalate resin having an acid number above 100 and being baked on the wire to a partially oxidized and blackened state at a baking speed substantially in excess of the baking speed permissible in baking a wire coating composed entirely of the corresponding superpolyamide under similar conditions to a substantially blackened, and equivalent flexible, tightly adhering state.

5. The method of making a copper wire having a semi-glossy, black, continuous, flexible coating tightly adhering thereto which comprises coating said wire with a composition comprising a superpolyamide modified with a substantial amount but not exceeding 40% by weight thereof of an alkyd resin having an acid number above 50, baking said coating on said wire to a partially oxidized and blackened state at a baking speed substantially in excess of the baking speed permissible in baking a wire coating composed entirely of the corresponding superpolyamide under similar conditions to a substantially blackened, and equivalent flexible, tightly adhering state.

WILLIAM J. SCHEIBER.